3,707,382
PRODUCTION OF COCOA LIQUOR
Walter Rostagno, Corseaux, Switzerland, assignor to Societe d'Assistance Technique Pour Produits Nestle S.A., Lausanne, Switzerland
Filed July 30, 1970, Ser. No. 59,474
Claims priority, application Great Britain, Mar. 5, 1970, 10,710/70
Int. Cl. A23g 1/00
U.S. Cl. 99—26                                    24 Claims

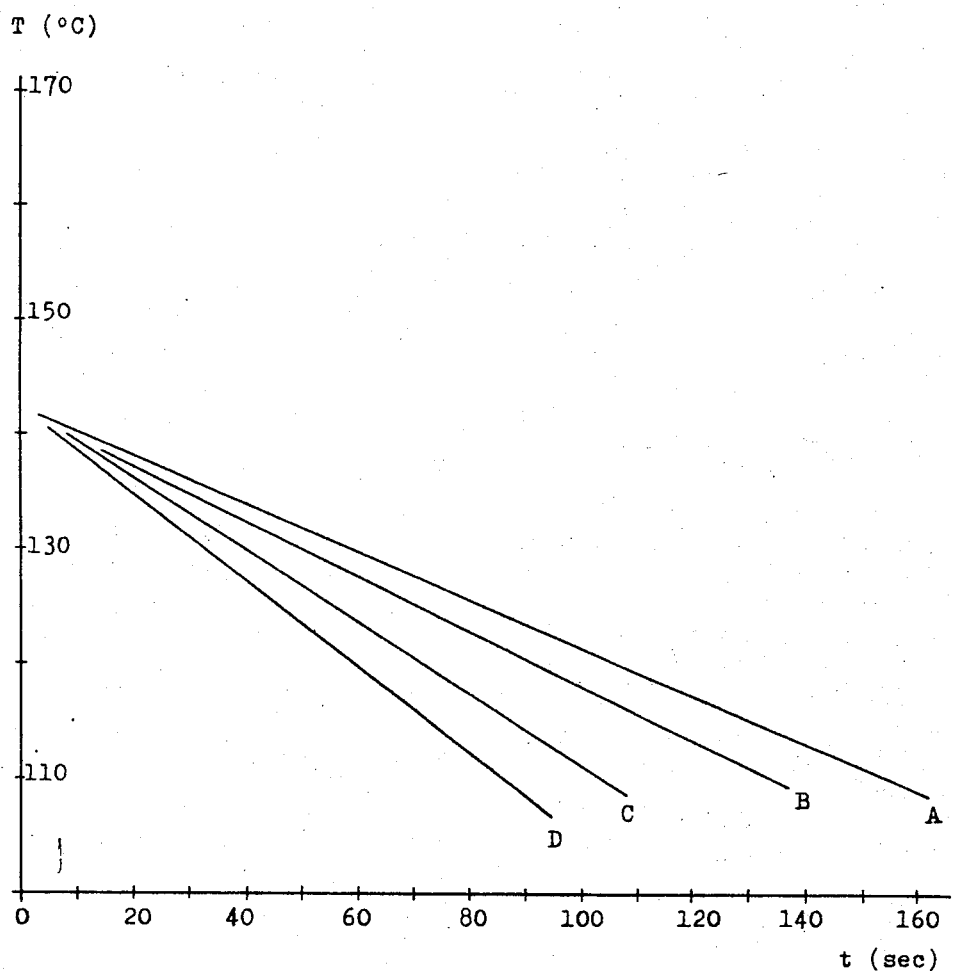

ABSTRACT OF THE DISCLOSURE

Cocoa liquor is prepared by heating ground fermented cocoa beans from a temperature of 40 to 80° C. to a temperaure of 100 to 160° C. for 2 to 120 seconds, thereby to roast said liquor, followed by cooling to below 80° C. An alkali and/or a flavour precursor such as an amino acid, vitamin $B_1$ or fructose may be added before heating.

---

This invention is concerned with the production of cocoa liquor.

The traditional process for producing cocoa liquor comprises roasting fermented cocoa beans, removing the shells and grinding the kernels. The roasting, which develops the characteristic flavour in the beans, involves heating the whole beans in air at about 100–160° C. Because heat transfer between the air and the beans is relatively poor, the operation may take up to 45 minutes before a satisfactory roast degree is obtained. During grinding, the fat present in the beans (constituting up to about 55% of their weight) is melted, so that the ground material is a viscous liquor, known as cocoa liquor.

It has been recognised that roasting of the beans in ground condition would present advantages, and processes based on this principle are described in the literature. However, no really satisfactory process has yet been described.

An object of the present invention is to provide a simple, continuous process for producing roasted cocoa liquor from fermented cocoa beans.

A further object of the invention is to provide methods for enhancing certain flavor notes in the finished liquor, by incorporating specific flavor pjrecursors to ground, unfermented cocoa beans before roasting.

The process for preparing cocoa liquor according to the present invention comprises grinding deshelled fermented cocoa beans to provide a liquor, heating the liquor from an initial temperature of 40 to 80° C. to a final temperature of 100 to 160° C. in a period of time between 2 seconds and 120 seconds, and cooling the heated liquor from the final temperature to a temperature of 40 to 80° C., the heating and cooling of the liquor being effected in a closed system.

It will readily be appreciated that the time during which heat is supplied to the beans will be dependent on the initial and final temperatures selected, and will decrease with increase of the final temperature. The drawing shows by way of example the approximate relationship between final temperature (T) and heating time (t) for a "Votator" having a heating area of 0.19 m.² supplied with steam at 2.3 kg./cm.². Lines A, B, C and D correspond to initial temperatures of 50, 60, 70 and 80° C., respectively. The heating time is also related to the rate at which heat is supplied.

In carrying out the process, the outer shells are first removed from the beans, and the kernels are ground. The heat generated during grinding melts the fat present in the beans, so that a fluid liquor is obtained. Prior to roasting, it is desirable to reduce the moisture content of the liquor. advantageously to below 1% by weight, for example 0.6 to 0.7%. This may conveniently be achieved by passing the liquor through an evaporator operating under reduced pressure. A falling film evaporator is especially suitable. It has been found that removal of moisture from the liquor prior to roasting reduces its viscosity, making it more fluid. The reduction of moisture also gives a standardised liquor which is roasted in an extremely short period of time.

After removal of moisture, the liquor may be warmed, for example to about 80° C. in a jacketed tank, and is then passed to a heat exchanger, preferably of the type known as a "Votator." The liquor is distributed within the heat exchanger as a relatively thin film which is in contact with a surface heated by stream. The residence time of the liquor is regulated by adjusting the rate of flow, whereas the temperature is adjusted by regulating the pressure of the steam supplied to the jacket surrounding the heat-exchange surface.

The hot liquor, which is roasted in one pass, is then cooled, preferably in a second heat exchanger of the "Votator" type. The actual temperature to which the liquor is cooled is of little significance, provided that it is below about 80° C. The liquor may then be further processed as desired, either for the production of chocolate or of cocoa powder. In the former case, the liquor is mixed with sugar and other ingredients before being refined and conched in the usual manner. When cocoa powder is to be produced, the liquor may be passed directly to a press for the separation of cocoa butter.

According to a feature of the invention, various flavour precursors may be added to the ground beans before the heat treatment. The precursors which have been found to give particularly desirable flavour notes in the roasted liquor are vitamin $B_1$ and fructose, as well as amino acids such as phenylalanine, arginine, threonine, glutamic acid and lysine. Vitamin $B_1$, ascorbic acid or fructose may be added individually whereas the amino acids should preferably be used together with fructose, either singly or as mixtures of two or more acids. The quantity of the precursor which is added to the ground beans before heat treatment will depend on the intensity of flavour desired, but in general will not exceed 1% by weight. The lower limit is dictated by perceptibility, and is usually around 0.5% for the sugars and acids, and about 25 p.p.m. for vitamin $B_1$. Each of the specified precursors confers a characteristic flavour note to the finished chocolate liquor. Thus vitamin $B_1$ produces a light nutty note whereas fructose accentuates bitterness, providing a toasted note. Addition of fructose to Bahia cocoa beans is particularly advantageous.

According to a further feature of the invention, an alkali may be added to the liquor prior to roasting thereby producing dutched liquor. The quantity of alkali, preferably potassium carbonate, will generally correspond to 1 to 2% by weight of the cocoa liquor, for example about 1.5%. When an alkali is added a slightly higher final temperature, for example 145 to 150° C. is preferred.

It will be seen from the foregoing that the present invention provides a continuous process for producing a uniformly-roasted cocoa liquor which is suitable for use in the production of chocolate, both plain and milk, and it may also be defatted as in the production of cocoa powder.

Yet another advantage of the process according to the invention is that roasted liquors of improved bacteriological quality are obtained. Thus, for example, from cocoa beans having a bacterial count of 250,000–320,000 germs/gram a roasted liquor with a count of 20,000–36,00 germs/gram is obtained. It is significant to note in this context that conventional roasting procedures have no appreciable influence on the germ count of cocoa beans.

The following examples, in which all parts and percentages are by weight, are given only for the purpose of illustrating the invention.

EXAMPLE 1

Raw cocoa beans, dried to a moisture content of 2.5%, are cracked, winnowed and ground.

58 kg. of ground beans are heated to 78–80° C. and the heated liquor is pumped at a rate of 1 kg./mn. to a falling film evaporator operating at a pressure of 15 mm. Hg.

The liquor from the evaporator, having a moisture content of 0.7%, is then pumped at a rate of 1 kg./mn. into a "Votator" heat exchanger having a heating surface of 0.19 m.² Steam is supplied to the jacket of the "Votator" at sufficient pressure to give a final liquor temperature of 135° C. The residence time is 25 seconds. The hot liquor is then cooled to 80° C. in a second heat exchanger, and may be used directly in the production of chocolate.

EXAMPLE 2

The procedure of Example 1 is repeated, except that the exit temperature of the liquor is 140° C. with a residence time of 7.4 sec.

EXAMPLE 3

Raw cocoa beans, dried to a moisture content of 2.5%, are cracked, winnowed and ground.

58 kg. of ground beans are mixed with 87 g. of finely ground potassium carbonate and the mixture, heated to 78 to 80° C. is pumped to a "Votator" at a rate of 1 kg./mn. The flow of liquid is so adjusted to give an exit temperature of 145–150° C. with a residence time of 25 seconds.

The dutched roasted liquor thus obtained is used for the manufacture of cocoa powder.

EXAMPLE 4

The procedure of Example 1 is repeated, but flavour precursors are added prior to roasting in the quantities indicated. The results obtained are summarised in the table:

| Type of cocoa | Precursor added | Flavour evaluation |
|---|---|---|
| Bahia | (a) Fructose, 0.5% | Cocoa1 note more pronounced. Smoky flavour of Bahia cocoa corrected. |
| Ghana | (b) Fructose, 0.5%. Vitamin B₁, 25 p.p.m. | Hazelnut note. |
| Do | (c) Fructose, 0.5%. Arginine, 0.18%. Phenylalanine, 0.32%. | Cocoa note more pronounced. Slightly spicy. |
| Do | (d) Fructose, 0.5%. Lysine, 0.12%. Arginine 0.12%. Glutamic acid, 0.18%. Threonine, 0.01%. | Cocoa note more pronounced. Slightly more bitter. |
| Do | (e) Ascorbic acid, 0.5%. Arginine, 0.18%. Phenylalanine, 0.32%. | Cocoa note more pronounced. Slightly flowery. |

What is claimed is:

1. A process for preparing cocoa liquor which comprises grinding deshelled fermented cocoa beans to provide a liquor, heating the liquor from an initial temperature of 40 to 80° C. to a final temperature of 100 to 160° C. in a period of time between 2 seconds and 120 seconds thereby to roast said cocoa liquor, and cooling the heated liquor from the final temperature to a temperature not exceeding 80° C., the heating and cooling of the liquor being effected in a closed system.

2. A process according to claim 1, in which after grinding the moisture content of the liquor is reduced to below 1% by weight.

3. A process according to claim 2, in which the moisture content of the liquor is reduced by evaporation under reduced pressure.

4. A process according to claim 1, in which the initial temperature of the liquor is about 80° C.

5. A process according to claim 1, in which the heating time does not exceed 30 seconds.

6. A process according to claim 5, in which after heating the liquor is cooled to a temperature of 40 to 80° C.

7. A process according to claim 1, in which prior to heating an effective amount of at least one flavour precursor is added to the liquor.

8. A process according to claim 7, in which the flavour precursor is vitamin B₁.

9. A process according to claim 8, in which the amount of vitamin B₁ added to the liquor is about 25 p.p.m.

10. A process according to claim 7, in which the flavour precursor is fructose or ascorbic acid.

11. A process according to claim 10, in which the quantity of precursor added does not exceed 1% of the weight of the liquor.

12. A process according to claim 11, in which the quantity of precursor added is about 0.5% of the weight of the liquor.

13. A process according to claim 7, in which the flavour precursor is an amino acid.

14. A process according to claim 9, in which an amino acid is also added as a flavour precursor.

15. A process according to claim 10, in which an amino acid is also added as a flavour precursor.

16. A process according to claim 13, in which the amino acid is at least one of phenylalanine, arginine, threonine, glutamic acid and lysine.

17. A process according to claim 14, in which the amino acid is at least one of phenylalanine, arginine, threonine, glutamic acid and lysine.

18. A process according to claim 15, in which the amino acid is at least one of phenylalanine, arginine, threonine, glutamic acid and lysine.

19. A process according to claim 1, in which the final temperature is 130 to 140° C.

20. A process according to claim 1 for the preparation of dutched cocoa liquor, in which an alkali is added to the liquor prior to heating.

21. A process according to claim 20, in which the quantity of alkali added corresponds to 1 to 2% of the weight of the liquor.

22. A process according to claim 20, in which the alkali is potassium carbonate.

23. A process according to claim 20, in which the final temperature is 145 to 150° C.

24. A process according to claim 20, in which prior to heating an effective amount of at least one flavour precursor is added to the liquor.

References Cited

UNITED STATES PATENTS

| 2,004,497 | 6/1935 | Bajda | 99—26 |
| 3,226,237 | 12/1965 | Magnino | 99—26 X |
| 3,472,658 | 10/1969 | Isaacs | 99—26 |
| 2,397,402 | 3/1946 | Benedict | 99—26 X |
| 3,056,677 | 10/1962 | Colten | 99—26 |

(Other references on following page)

FOREIGN PATENTS

| | | | |
|---|---|---|---|
| 528,692 | 11/1940 | Great Britain | 99—26 |
| 562,123 | 6/1944 | Great Britain | 99—26 |
| 297,888 | 3/1912 | Germany. | |
| 715,347 | 12/1931 | France. | |

OTHER REFERENCES

The Chemistry, Flavouring and Manufacture of Chocolate Confectionery and Cocoa, Jensen, 1931; Churchill Co., London; p. 76.

Williams, Chocolate and Confectionery; Leonard Hill, London, 1964, p. 108.

Whymper, Cocoa and Chocolate; Churchill, London 1912, pp. 80 and 81.

S. LEON BASHORE, Primary Examiner

F. FREI, Assistant Examiner

U.S. Cl. X.R.

99—23